(12) United States Patent
Murakami et al.

(10) Patent No.: US 8,009,968 B2
(45) Date of Patent: Aug. 30, 2011

(54) RECORDING APPARATUS, RECORDING METHOD, PROGRAM, RECORDING MEDIUM, AND DATA RECORDING MEDIUM

(75) Inventors: Masaharu Murakami, Tokyo (JP); Shigeru Kashiwagi, Tokyo (JP)

(73) Assignee: Sony Corporation (JP)

( * ) Notice: Subject to any disclaimer, the term of this patent is extended or adjusted under 35 U.S.C. 154(b) by 1504 days.

(21) Appl. No.: 11/435,342

(22) Filed: May 16, 2006

(65) Prior Publication Data
US 2006/0288027 A1 Dec. 21, 2006

(30) Foreign Application Priority Data
Jun. 17, 2005 (JP) ................................ 2005-177644

(51) Int. Cl.
*H04N 5/917* (2006.01)
(52) U.S. Cl. ...................................................... 386/331
(58) Field of Classification Search .................. None
See application file for complete search history.

(56) References Cited

U.S. PATENT DOCUMENTS
6,289,165 B1 * 9/2001 Abecassis .................... 386/46
2005/0276580 A1 * 12/2005 Zacek ......................... 386/131

FOREIGN PATENT DOCUMENTS
| JP | 2002-197839 A | 7/2002 |
| JP | 2004-007533 A | 1/2004 |
| JP | 2004-213834 A | 7/2004 |
| JP | 2005-038516 A | 2/2005 |
| JP | 2005-065110 A | 3/2005 |
| JP | 2005-117358 A | 4/2005 |

* cited by examiner

*Primary Examiner* — Peter-Anthony Pappas
*Assistant Examiner* — Daniel Tekle
(74) *Attorney, Agent, or Firm* — Lerner, David, Littenberg, Krumholz & Mentlik, LLP

(57) ABSTRACT

A recording apparatus includes a first recording control unit configured to control recording of first management information so that fragments of the first management information and fragments of data are alternately placed, each fragment of the first management information being used to read the corresponding data fragment; a second recording control unit configured to control recording of second management information after all of the data has been recorded, the second management information being used to read all of the data; and a rewrite control unit configured to control rewrite of the first management information or the data after all of the data has been recorded so that any fragment of the first management information is not used to read the corresponding data fragment.

9 Claims, 11 Drawing Sheets

RECORDING APPARATUS, RECORDING METHOD, PROGRAM, RECORDING MEDIUM, AND DATA RECORDING MEDIUM

CROSS-REFERENCE TO RELATED APPLICATIONS

The present application claims priority from Japanese Patent Application No. JP 2005-177644 filed on Jun. 17, 2005, the disclosure of which is hereby incorporated by reference herein.

BACKGROUND OF THE INVENTION

The present invention relates to a recording apparatus, a recording method, a program, a recording medium, and a data recording medium. Particularly, the present invention relates to a recording apparatus, a recording method, a program, a recording medium, and a data recording medium in which data can be recorded together with management information used to read the data.

An MP4 (MPEG-4) file format is now widely used as a typical recording format because it does not depend on a platform, is compatible with various recording methods, and has extensibility.

An MP4 file, which is compatible with the MP4 file format, is composed of two parts: an mdat box to store actual data of video or audio data; and a moov box to store management information of the actual data. Since the entire management information is stored in one area, the MP4 file has the upper hand in terms of random accessibility and the like.

FIG. 1 is a flowchart illustrating a known process of recording an MP4 file. In step S11, an ftyp box and a header of an mdat box are output and are written at the top of the file. The header of the mdat box includes four-byte information indicating the size and four characters "mdat" indicating the name of the mdat box. In this case, the information indicating the size is a temporary value.

In step S12, video and audio data is compressed. The compressed video and audio data is multiplexed. In step S13, management information is obtained. The management information indicates the size and playback time of the compressed video and audio data.

In step S14, the compressed video and audio data is interleaved. In step S15, the compressed and interleaved data is output and is written after the header of the mdat box in the file. In step S16, an offset of the written data in the file is held.

In step S17, the management information indicating the size, playback time, and offset of the compressed data is held on a memory.

In step S18, whether all data has been recorded is determined. If it is determined in step S18 that not all data has been recorded, the process returns to step S12 and the above-described steps are repeated.

If it is determined in step S18 that all data has been recorded, the process proceeds to step S19, where the information indicating the size included in the header of the mdat box is corrected. In step S20, a moov box as entire management information is output and is written after the mdat box, so that the file is completed. Then, the process ends.

As shown in FIG. 2A, the complete file includes the ftyp box, the mdat box, and the moov box arranged in this order. When the video and audio data stored in the mdat box is to be read, the management information stored in the moov box is read and then the read management information is referred to, so that desired video and audio data is read.

Alternatively, the compressed video and audio data may be held in another area, the moov box as the entire management information may be written after the ftyp box, and then the compressed video and audio data held in the other area may be written as the mdat box after the moov box. In this case, as shown in FIG. 2B, the complete file includes the ftyp box, the moov box, and the mdat box arranged in this order.

As described above, the entire necessary management information can be obtained only after all actual data has been recorded or compressed, and thus the management information is written (recorded) on a recording medium at the end of the recording process. Therefore, if the recording process abnormally ends during the process, the management information is not recorded and thus the video or audio data may not be played back.

On the other hand, so-called fragment recording, in which management information is recorded while being fragmented, has been suggested as the MP4 file format.

FIG. 3 is a flowchart illustrating a known process of fragment recording of an MP4 file. In step S31, an ftyp box is output and is written at the top of the file. In step S32, a header of an mdat box is output and is written. In step S33, video and audio data is compressed. The compressed video and audio data is multiplexed. In step S34, management information indicating the size and playback time of the compressed video and audio data is obtained.

In step S35, the compressed video and audio data is interleaved. In step S36, the compressed and interleaved data is sequentially output and is written after the header of the mdat box in the file. In step S37, an offset of the written data in the file is held. In step S38, the management information indicating the size, playback time, and offset of the compressed data is held on a memory.

In step S39, whether all data has been recorded is determined. If it is determined in step S39 that not all data has been recorded, the process proceeds to step S40, where whether one fragment of the compressed data has been recorded is determined. One fragment includes compressed data of a predetermined playback time.

If it is determined in step S40 that one fragment of the compressed data has been recorded, the process proceeds to step S41, where information indicating the size included in the header of the mdat box in which the compressed data has been written and in which a corresponding management information fragment has not been written is corrected. In step S42, a management information fragment used to refer to the fragment of the compressed data is output and is written after the mdat box.

More specifically, in step S42, a management information fragment about the first mdat box in the file is written as an initial moov box, whereas a management information fragment about the second or more mdat box is written as a moof box.

After step S42, the process returns to step S32, where a header of the next mdat box is written, and then another fragment of the compressed data is recorded.

If it is determined in step S40 that one fragment of the compressed data has not been recorded, the process returns to step S33, and the above-described steps are repeated.

If it is determined in step S39 that all data has been recorded, the process proceeds to step S43, where information indicating the size included in the header of the mdat box in which the compressed data has been written and in which a corresponding management information fragment has not been written is corrected. In step S44, a management information fragment used to refer to the fragment of the compressed data is output and is written after the mdat box. Then, the process ends.

More specifically, in step S44, a management information fragment about the first mdat box in the file is written as an initial moov box, whereas a management information fragment about the second or more mdat box is written as a moof box.

As shown in FIG. 4A, in the complete file, the ftyp box is placed at the top, followed by the first mdat box and the initial moov box. After the initial moov box, mdat boxes and moof boxes are alternately placed. When the video and audio data fragment stored in the first mdat box in the file is to be read, the management information fragment stored in the initial moov box is read and is referred to, so that the video and audio data fragment stored in the first mdat box in the file is read. When the video and audio data fragment stored in the second or more mdat box in the file is to be read, the management information fragment stored in the moof box placed after the corresponding mdat box is read and is referred to, so that the video and audio data fragment in that mdat box is read.

Alternatively, the following method can be adopted. The compressed video and audio data is held in another area. After the initial moov box as a management information fragment about the first mdat box is written after the ftyp box, a fragment of the compressed video and audio data held in the other area is written as a first mdat box after the initial moov box. Then, a moof box as a management information fragment bout a second mdat box is written after the first mdat box, and another fragment of the compressed video and audio data is written as the second mdat box. Then, this process is repeated. In this case, as shown in FIG. 4B, the complete file includes the ftyp box placed at the top, followed by the initial moov box and the first mdat box. After the first mdat box, moof boxes and mdat boxes are alternately placed.

In the fragment recording, each fragment of management information is recorded as an initial moov box or a moof box in the file, so that video or audio data can be played back within the recorded management information even if the recording process abnormally ends during the process.

However, random access takes time because the management information is fragmented in the file. For example, when video or audio data at the time after one hour from the start of playback is to be played back according to the time on the video data to be played back, the initial moov box and the moof boxes need to be sequentially read, so that seek takes time.

On the other hand, Patent Document 1 (Japanese Unexamined Patent Application Publication No. 2002-197839) discloses a method of recording management information in another file at predetermined time intervals and recording the entire management information at the end of the recording process, so as to maintain the upper hand of random accessibility.

In this method, data can be quickly and randomly accessed by using the entire management information. Even if the recording process abnormally ends, the entire management information can be reestablished on the basis of management information fragments in the file storing the data, and the data can be played back on the basis of the reestablished management information.

SUMMARY OF THE INVENTION

In the method disclosed in Patent Document 1, however, the data and the management information are stored in different files, so that the different files are dealt with at the same time. Since respective file systems have different restrictions, a plurality of files may not be dealt with at the same time in some file systems.

Furthermore, the file system is required to have a special function of sequentially placing data fragments stored in different files on a recording medium. If data fragments stored in different files cannot be sequentially placed on a recording medium, that is, if data and management information cannot be sequentially placed on a recording medium, inefficient seek occurs when data is read and then management information is read or when management information is read and then data is read. Accordingly, seamless recording and playback may not be performed.

The present invention has been made in view of these circumstances and is directed to enabling quick and random access without necessity of dealing with a plurality of files at the same time and enabling playback of data even if a recording process abnormally ends.

According to an embodiment of the present invention, a recording apparatus includes a first recording control unit configured to control recording of first management information so that fragments of the first management information and fragments of data are alternately placed, each fragment of the first management information being used to read the corresponding data fragment; a second recording control unit configured to control recording of second management information after all of the data has been recorded, the second management information being used to read all of the data; and a rewrite control unit configured to control rewrite of the first management information or the data after all of the data has been recorded so that any fragment of the first management information is not used to read the corresponding data fragment.

With this configuration, recording of the first management information is controlled so that fragments of the first management information and fragments of the data are alternately placed, each fragment of the first management information being used to read the corresponding data fragment; recording of the second management information is controlled after all of the data has been recorded, the second management information being used to read all of the data; and rewrite of the first management information or the data is controlled after all of the data has been recorded so that any fragment of the first management information is not used to read the corresponding data fragment.

The first recording control unit controls recording of the first management information in a file so that the fragments of the first management information and the fragments of the data are alternately placed, each fragment of the first management information being used to read the corresponding data fragment stored in the file. The second recording control unit controls recording of the second management information in the file after all of the data has been recorded, the second management information being used to read all of the data stored in the file.

The rewrite control unit may control rewrite of the name of the first management information so that any fragment of the first management information is not used to read the corresponding data fragment.

The rewrite control unit may control rewrite of the name of the first management information so that each fragment of the first management information as an initial moov box or a moof box is rewritten to a free box.

The rewrite control unit may control rewrite of information indicating the amount of the data so that any fragment of the first management information is not used to read the corresponding data fragment.

The rewrite control unit may control rewrite of the information indicating the amount of the data, the information being the size of an mdat box.

According to another embodiment of the present invention, a data recording medium stores a file including areas and second management information, the areas being generated by rewriting fragments of first management information, which are placed between fragments of data and are used to read the corresponding data fragment, so that any fragment of the first management information is not used to read the corresponding data fragment, and the second management information being used to read all of the data.

According to the above-described configuration, data can be recorded and played back. Also, the playback side can quickly and randomly access the data without dealing with a plurality of files at the same time, and the data can be played back even if a recording process abnormally ends.

DETAILED DESCRIPTION

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

Figure 6:
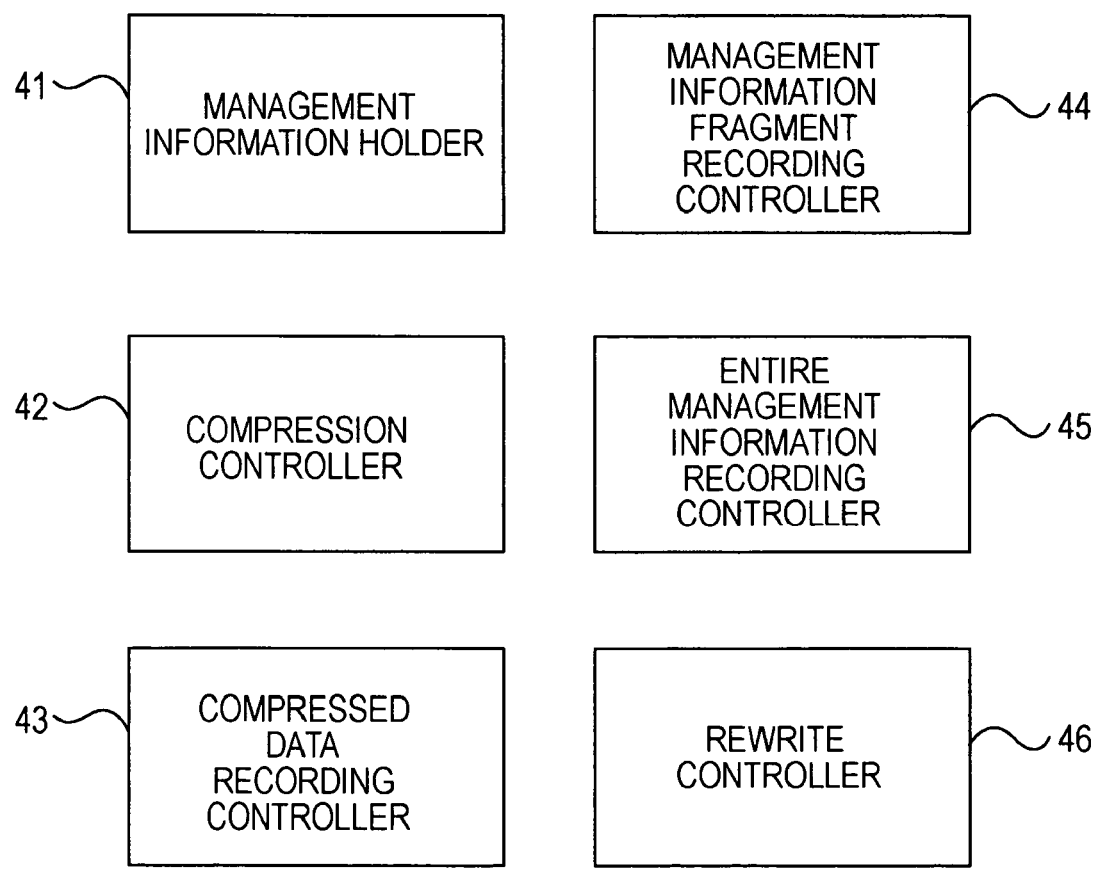
FIG. 6 is a block diagram showing a functional configuration realized by a system controlling microcomputer that executes a program.

A recording apparatus according to an embodiment of the present invention includes a first recording control unit (e.g., the management information fragment recording controller 44 shown in FIG. 6) configured to control recording of first management information so that fragments of the first management information and fragments of data are alternately placed, each fragment of the first management information being used to read the corresponding data fragment; a second recording control unit (e.g., the entire management information recording controller 45 shown in FIG. 6) configured to control recording of second management information after all of the data has been recorded, the second management information being used to read all of the data; and a rewrite control unit (e.g., the rewrite controller 46 shown in FIG. 6) configured to control rewrite of the first management information or the data after all of the data has been recorded so that any fragment of the first management information is not used to read the corresponding data fragment.

Figure 7:
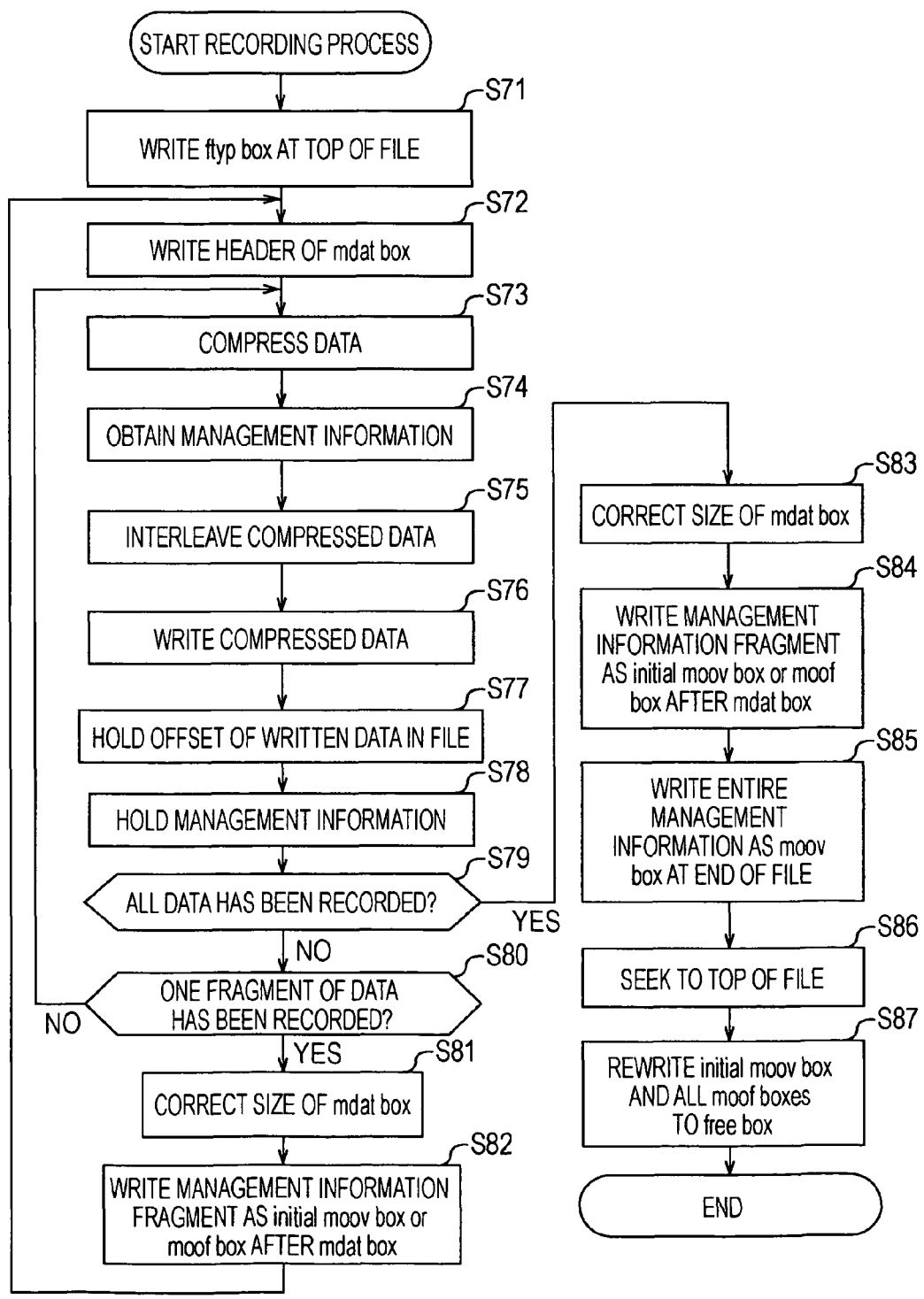
FIG. 7 is a flowchart illustrating an example of a recording process.

A recording method according to an embodiment of the present invention includes the steps of: controlling recording of first management information so that fragments of the first management information and fragments of data are alternately placed, each fragment of the first management information being used to read the corresponding data fragment (e.g., step S82 shown in FIG. 7); controlling recording of second management information after all of the data has been recorded, the second management information being used to read all of the data (e.g., step S85 shown in FIG. 7); and controlling rewrite of the first management information or the data after all of the data has been recorded so that any fragment of the first management information is not used to read the corresponding data fragment (e.g., step S87 shown in FIG. 7).

A data recording medium according to an embodiment of the present invention stores a file including areas (e.g., the free box 62-1 shown in FIG. 8B) and second management information (e.g., the moov box 61 shown in FIG. 8B), the areas being generated by rewriting fragments of first management information (e.g., the initial moov box 53 shown in FIG. 8A), which are placed between fragments of data and are used to read the corresponding data fragment, so that any fragment of the first management information is not used to read the corresponding data fragment, and the second management information being used to read all of the data.

Figure 1:
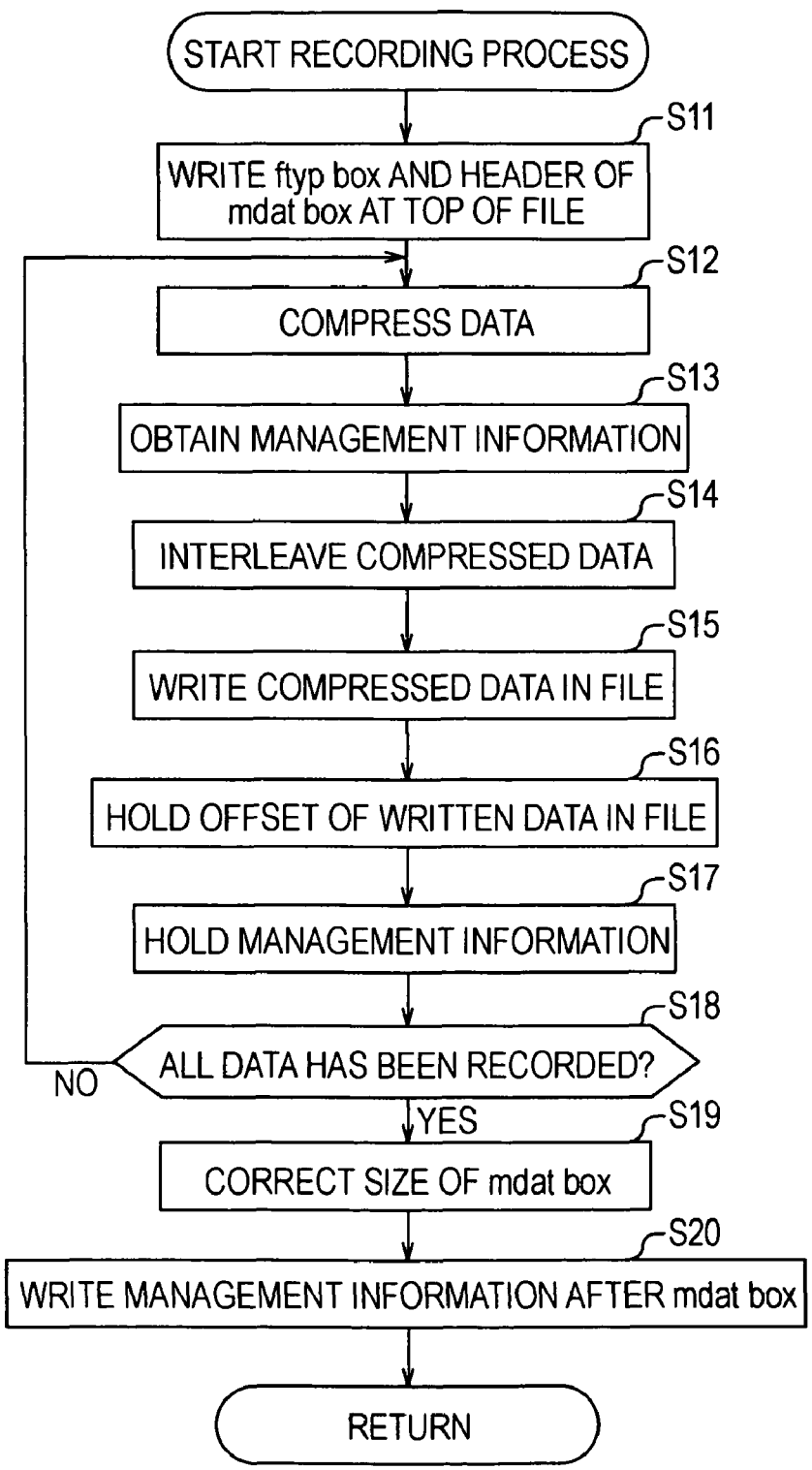
FIG. 1 is a flowchart illustrating a known process of recording an MP4 file.
Figure 2A:
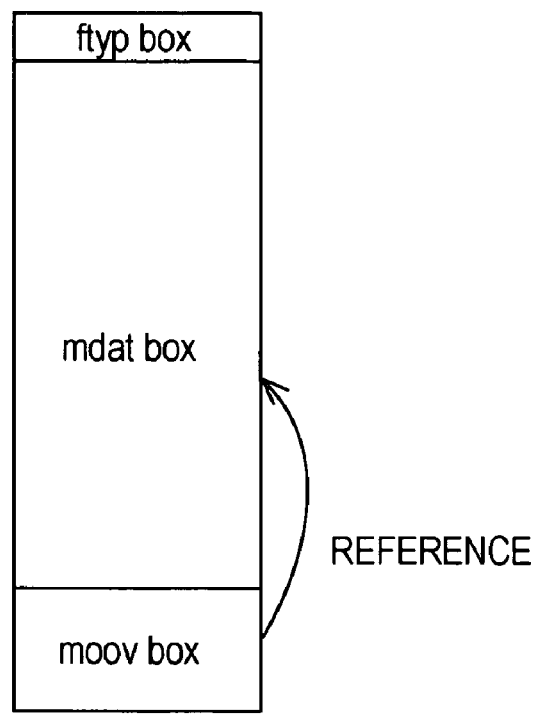
FIGS. 2A and 2B show configurations of a known MP4 file.
Figure 2B:
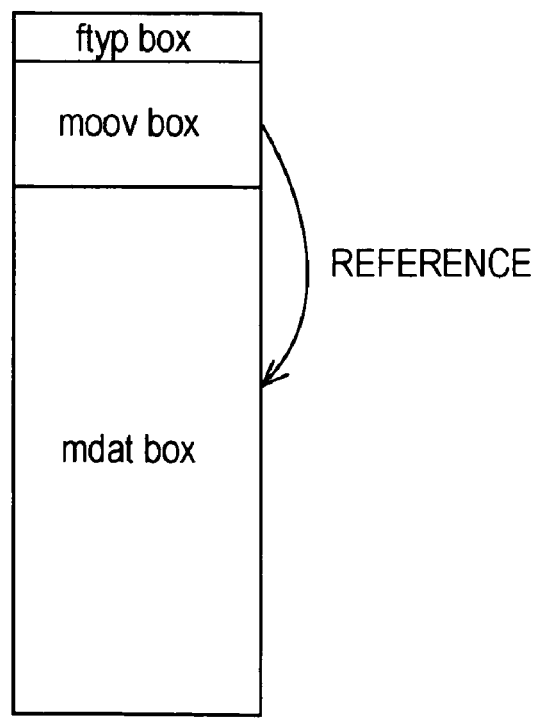
Figure 3:
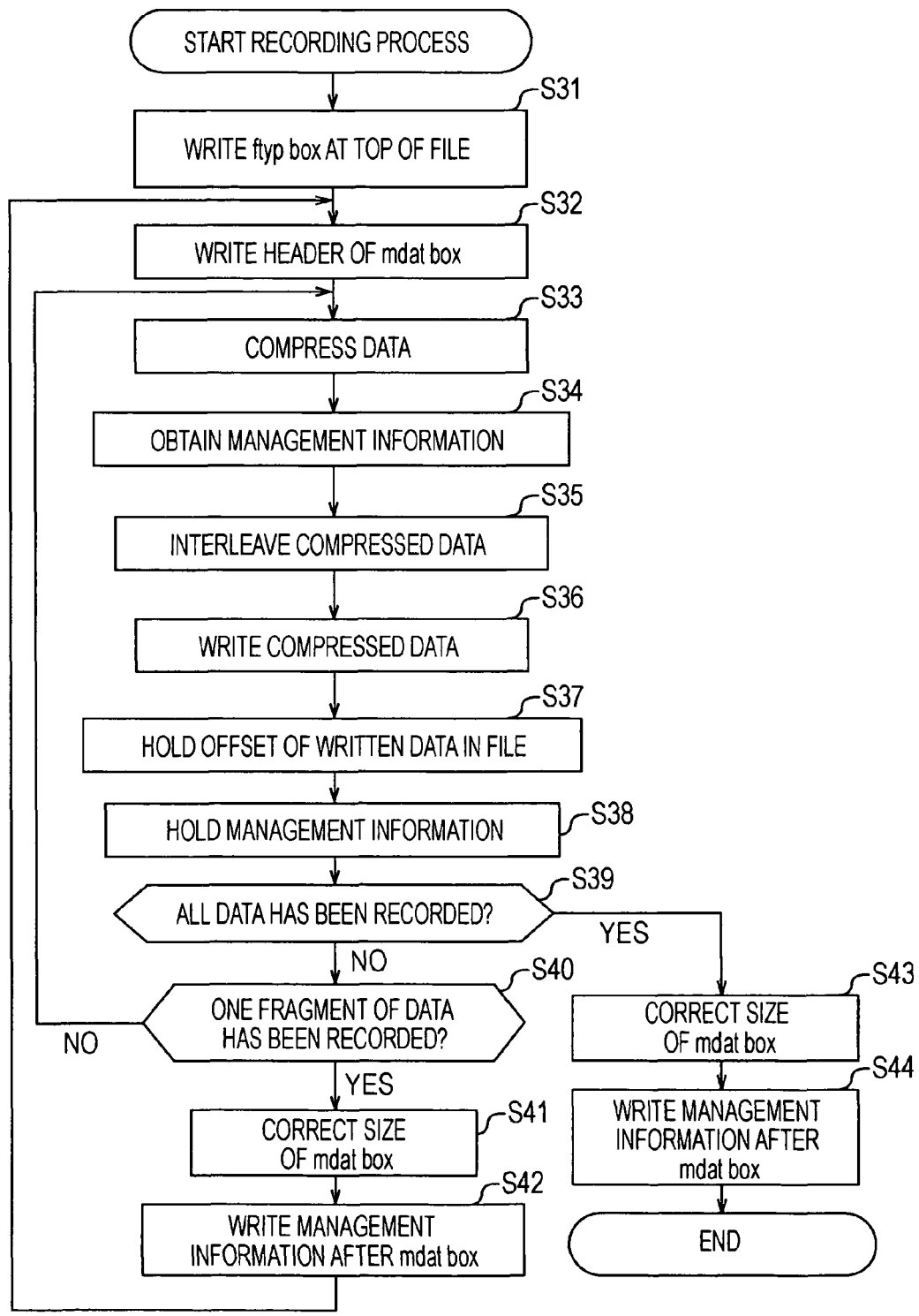
FIG. 3 is a flowchart illustrating another known process of recording an MP4 file.
Figure 4A:
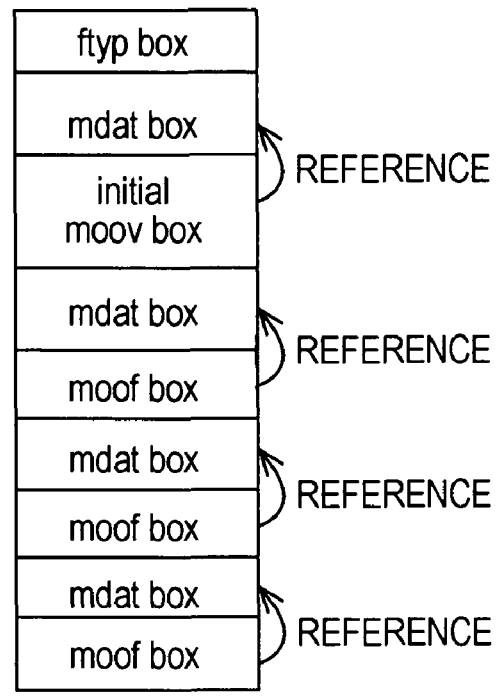
FIGS. 4A and 4B show other configurations of the known MP4 file.
Figure 4B:
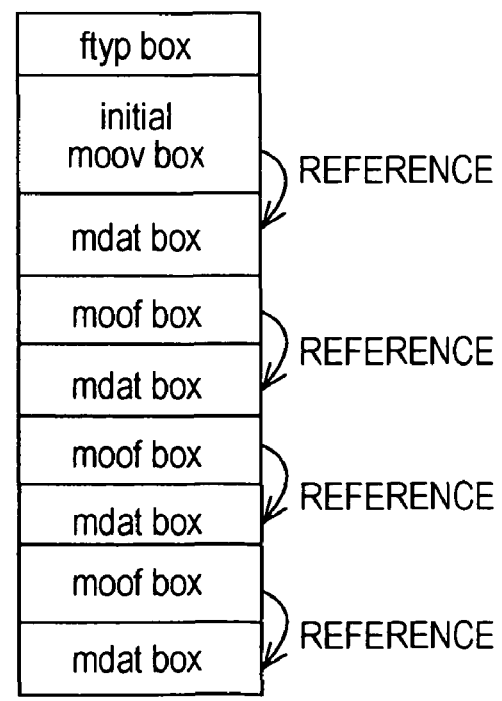
Figure 5:
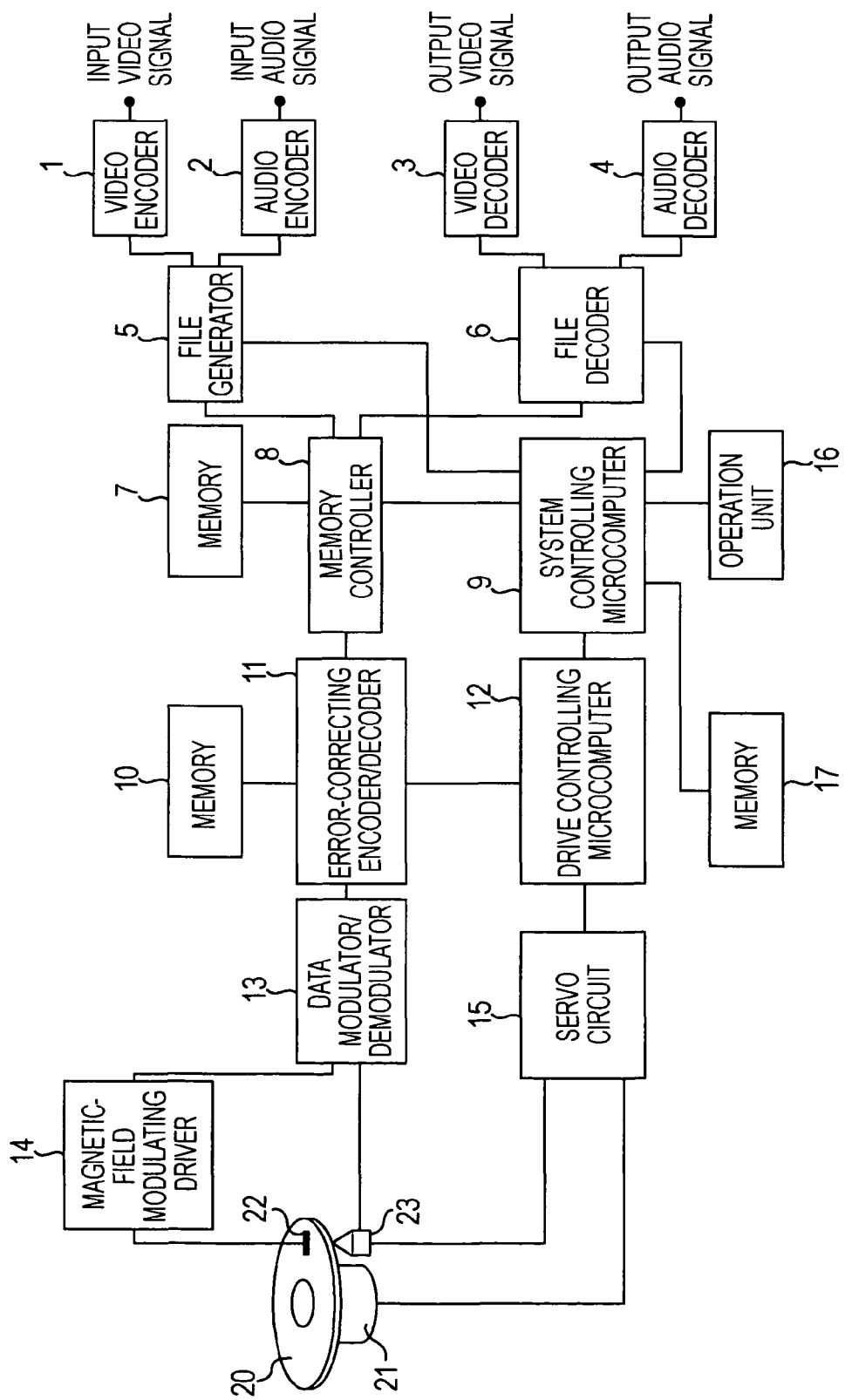
FIG. 5 is a block diagram showing a configuration of a recording/playback apparatus according to an embodiment of the present invention.

FIG. 5 is a block diagram showing a configuration of a recording/playback apparatus according to an embodiment of the present invention. The recording/playback apparatus is a digital video camera, for example.

In FIG. 5, the recording/playback apparatus includes a video encoder 1, an audio encoder 2, a video decoder 3, an audio decoder 4, a file generator 5, a file decoder 6, memories 7, 10, and 17, a memory controller 8, a system controlling microcomputer 9, an error-correcting encoder/decoder 11, a drive controlling microcomputer 12, a data modulator/demodulator 13, a magnetic-field modulating driver 14, a servo circuit 15, an operation unit 16, a motor 21, a magnetic-field head 22, and an optical pickup 23.

A video signal is supplied through a video input terminal to the video encoder 1 and is compressed and encoded. An audio signal is supplied through an audio input terminal to the audio encoder 2 and is compressed and encoded. In this embodiment, MPEG4 (Moving Picture Experts Group phase 4) is used in the compression and encoding. The video encoder 1 and the audio encoder 2 output an elementary stream, which is obtained as a result of the compression and encoding and which is an example of compressed data.

When MPEG4 is adopted, the video encoder 1 includes an image rearranging unit, a local decoding unit, a subtractor, a DCT (discrete cosine transform) unit, a quantizing unit, a variable-length encoding unit, and a buffer memory.

The video signal supplied to the video encoder 1 is input through the image rearranging unit and the subtractor to the DCT unit, where the video signal is DCT-processed. The image rearranging unit rearranges images in an order appropriate for encoding, that is, in an order appropriate for encoding I-VOP (video object plane) and P-VOP first and then encoding B-VOP. An output of the DCT unit is input to the quantizing unit and is quantized with a predetermined bit number. An output of the quantizing unit is input to the variable-length encoding unit and the local decoding unit. The variable-length encoding unit performs variable-length encoding on the input by using a predetermined encoding method, such as Huffman encoding, and outputs encoded data to the buffer memory. The buffer memory outputs the encoded data as an output of the video encoder 1 at a predetermined rate.

The local decoding unit includes a dequantizing unit, an inverse DCT unit, an adder, a frame memory, and a motion compensating unit. A signal input from the quantizing unit to the local decoding unit is dequantized by the dequantizing unit and is inversely transformed by the inverse DCT unit, so as to be decoded. The decoded signal is added to an output of the motion compensating unit by the adder and is input to the frame memory. An output of the frame memory is input to the motion compensating unit. The motion compensating unit performs forward prediction, backward prediction, and bidirectional prediction. An output of the motion compensating unit is input to the above-described adder and subtractor. The subtractor performs subtraction between the output of the image rearranging unit and the output of the motion compensating unit and generates a prediction error between the video signal and the decoded video signal decoded by the local decoding unit. In intra-frame coding (I-VOP), the subtractor does not perform subtraction but data passes therethrough.

The audio encoder 2 includes, for example, a sub-band encoding unit and an adaptive quantizing bit assigning unit.

An output of the video encoder 1 and an output of the audio encoder 2 are supplied to the file generator 5. The file generator 5 converts a data structure of a video elementary stream and an audio elementary stream so that the data has a file structure that can be dealt by computer software capable of playing back moving pictures, voices, and text in synchronization without using a specific hardware configuration. For example, the file generator 5 converts the data structure of the video elementary stream and the audio elementary stream so that the data structure becomes compatible with the MP4 file format. Then, the file generator 5 multiplexes the encoded video data and the encoded audio data. The file generator 5 is controlled by the system controlling microcomputer 9.

The MP4 file output from the file generator 5 is sequentially written in the memory 7 through the memory controller 8. The memory controller 8 reads the MP4 file from the memory 7 upon receiving a request of writing data on the recording medium 20 from the system controlling microcomputer 9.

Herein, a transfer rate used in encoding of the MP4 file is set to a rate lower than a transfer rate of writing data on the recording medium 20, for example, lower by ½. Therefore, although the MP4 file is continuously written in the memory 7, the MP4 file is intermittently read from the memory 7 under control by the system controlling microcomputer 9 so that overflow and underflow of the memory 7 can be prevented.

The MP4 file read from the memory 7 is supplied from the memory controller 8 to the error-correcting encoder/decoder 11. The error-correcting encoder/decoder 11 temporarily writes the MP4 file in the memory 10 and then performs interleaving and generates redundant data of an error correcting code. The error-correcting encoder/decoder 11 reads the data attached with the redundant data from the memory 10 and supplies it to the data modulator/demodulator 13.

The data modulator/demodulator 13 modulates the digital data before recording it on the recording medium 20 so that a clock can be easily extracted at playback and that a problem such as intersymbol interference does not occur. For example, a (1,7) RLL (run length limited) code or a trellis code can be used.

An output of the data modulator/demodulator 13 is supplied to the magnetic-field modulating driver 14 and to the optical pickup 23. The magnetic-field modulating driver 14 drives the magnetic-field head 22 in accordance with an input signal so as to apply a magnetic field to the recording medium 20. The optical pickup 23 radiates a recording laser beam to the recording medium 20 in accordance with an input signal. In this way, data is recorded on the recording medium 20.

The recording medium 20 is a rewritable optical disc, such as a magneto-optical (MO) disc or a phase-change disc.

In this embodiment, an MO disc of a small diameter is used as the recording medium 20. The recording medium 20 is rotated by the motor 21 at a constant linear velocity (CLV), a constant angular velocity (CAV), or a zone CLV (ZCLV).

The drive controlling microcomputer 12 outputs a signal to the servo circuit 15 in response to a request from the system controlling microcomputer 9. The servo circuit 15 controls the motor 21 and the optical pickup 23 in accordance with this output signal so as to control the entire drive. For example, the servo circuit 15 performs a movement servo in a direction of the diameter of the recording medium 20, a tracking servo, and a focus servo to the optical pickup 23, and controls the motor 21 so as to control a rotation number.

The system controlling microcomputer 9 connects to the operation unit 16 used by a user to input predetermined instructions and the memory 17 in which management information is to be written.

During playback, the optical pickup 23 radiates a laser beam for playback onto the recording medium 20 and receives reflected light therefrom by a photodetector in the optical pickup, so as to obtain playback signals. In this case, the drive controlling microcomputer 12 detects a tracking error and a focus error in the signal output from the photodetector in the optical pickup 23, and controls the optical pickup 23 through the servo circuit 15 so that a reading laser beam is positioned on a track and focuses on the track. Further, the drive controlling microcomputer 12 controls movements in the diameter direction of the optical pickup 23 in order to play back data stored in a desired position on the recording medium 20. The desired position is determined by a signal supplied from the system controlling microcomputer 9 to the drive controlling microcomputer 12, as during recording.

The playback signal from the optical pickup 23 is supplied to the data modulator/demodulator 13 and is demodulated. The demodulated data is supplied to the error-correcting encoder/decoder 11, is temporarily stored in the memory 10, and then deinterleaving and error correction are performed thereon. The MP4 file generated after the error correction is stored in the memory 7 through the memory controller 8.

The MP4 file stored in the memory 7 is output to the file decoder 6 in response to a request from the system controlling microcomputer 9. The system controlling microcomputer 9 controls the memory controller 8 and the drive controlling microcomputer 12 in order to prevent overflow and underflow of the memory 7 by monitoring the amount of data of the playback signal that is read from the recording medium 20 and is stored in the memory 7 and the amount of data read from the memory 7 and supplied to the file decoder 6, so that video and audio signals are sequentially played back. In this way, the system controlling microcomputer 9 intermittently reads data from the recording medium 20.

The file decoder 6 divides the MP4 file into a video elementary stream and an audio elementary stream under control by the system controlling microcomputer 9. The video elementary stream is supplied to the video decoder 3, is decompressed and decoded there, and is output from a video output terminal. The audio elementary stream is supplied to the audio decoder 4, is decompressed and decoded there, and is output from an audio output terminal. Herein, the file decoder 6 outputs the video elementary stream and the audio elementary stream so that the both streams synchronize with each other.

When MPEG4 is adopted, the video decoder 3 includes a buffer memory, a variable-length encoding/decoding unit, a dequantizing unit, an inverse DCT unit, an adder, a frame memory, a motion compensating unit, and an image rearranging unit. The adder adds an output of the dequantizing unit and an output of the motion compensating unit. However, the adder does not perform addition when decoding I-VOP. Images output from the adder are rearranged in an original order by the image rearranging unit.

FIG. 6 is a block diagram showing a functional configuration realized by the system controlling microcomputer 9 that executes a program. A management information holder 41 controls hold of management information in the memory 17. A compression controller 42 controls the video encoder 1 and the audio encoder 2.

A compressed data recording controller 43 controls the memory controller 8 so as to control recording of compressed data on the recording medium 20.

A management information fragment recording controller 44 controls recording of management information so that management information fragments and data fragments are alternately placed in an MP4 file, each management information fragment being used to read the corresponding data fragment. That is, the management information fragment recording controller 44 controls the file generator 5 in order to control recording of management information fragments as an initial moov box or a moof box corresponding to respective mdat boxes on the recording medium 20.

An entire management information recording controller 45 controls recording of entire management information that is used to read all data stored in the MP4 file, if all data has been recorded in the MP4 file. That is, the entire management information recording controller 45 controls the file generator 5 in order to control recording of entire management information as a moov box corresponding to all mdat boxes on the recording medium 20.

A rewrite controller 46 controls rewrite of the management information fragments recorded under control by the management information fragment recording controller 44 so that the respective management information fragments are not used to read data fragments. More specifically, after all data has been recorded, the rewrite controller 46 controls rewrite of the management information fragments or the data so that the respective management information fragments recorded under control by the management information fragment recording controller 44 are not used to read data fragments.

Hereinafter, an example of a process of recording data in the form of an MP4 file performed by the recording/playback apparatus is described with reference to the flowchart shown in FIG. 7. In step S71, the management information fragment recording controller 44 allows the file generator 5 to generate an ftyp box and output it to the top of a file, so that the ftyp box is written at the top of the file on the recording medium 20. In step S72, the management information fragment recording controller 44 allows the file generator 5 to generate a header of an mdat box and output it, so that the header of the mdat box is written on the recording medium 20. In step S72 that is performed for the first time, the header of the mdat box is written next to the ftyp box at the top of the file. In step S72 that is performed for the second time or thereafter, a header of an mdat box is written next to an initial moov box or a moof box that is written in the following step S82.

The header of the mdat box includes four-byte information indicating the size of the mdat box and four characters "mdat" indicating the name of the mdat box. The information indicating the size of the mdat box placed in the header of the mdat box in step S72 is a temporary value.

The process of writing the ftyp box or the header of the mdat box output from the file generator 5 on the recording medium 20 is described in detail below. The management information fragment recording controller 44 allows the memory controller 8 to output the ftyp box or the header of the mdat box to the error-correcting encoder/decoder 11. The error-correcting encoder/decoder 11 adds redundant data to the ftyp box or the header of the mdat box and supplies it to the data modulator/demodulator 13 under control by the drive controlling microcomputer 12. The data modulator/demodulator 13 modulates the ftyp box or the header of the mdat box and allows the magnetic-field modulating driver 14 and the optical pickup 23 to record the modulated ftyp box or the header of the mdat box on the recording medium 20.

A process of writing data or information output from the file generator 5 or writing data or information output from the system controlling microcomputer 9 on the recording medium 20 is the same as the process of writing the ftyp box or the header of the mdat box on the recording medium 20. Thus, the detailed description thereof is adequately omitted below.

In step S73, the compression controller 42 allows the video encoder 1 to compress a video signal and output video data obtained as a result of the compression. Also, the compression controller 42 allows the audio encoder 2 to compress an audio signal and output audio data obtained as a result of the compression. The compression controller 42 allows the file generator 5 to multiplex the compressed video and audio data. In step S74, the management information holder 41 obtains management information from the file generator 5. The management information indicates the size and playback time of the compressed video and audio data. Alternatively, the management information holder 41 may obtain the management information from the video encoder 1 and the audio encoder 2.

In step S75, the compressed data recording controller 43 allows the file generator 5 to interleave the compressed video and audio data. In step S76, the compressed data recording controller 43 allows the memory controller 8 to output the compressed and interleaved video and audio data to the error-correcting encoder/decoder 11. The compressed data recording controller 43 allows the drive controlling microcomputer 12 to sequentially write the compressed and interleaved data after the header of the mdat box in the file on the recording medium 20.

In step S77, the management information holder 41 obtains an offset of the written data in the file from the file generator 5 and holds the obtained offset in the memory 17. Herein, the offset means a distance from the top of the file to the written data on a logical address of the recording medium 20 (difference in address value).

In step S78, the management information holder 41 holds management information on the memory 17. The management information indicates the size, playback time, and offset of the compressed data.

In step S79, the compressed data recording controller 43 determines whether all data has been recorded. If it is determined in step S79 that not all data has been recorded, the process proceeds to step S80, where the compressed data recording controller 43 determines whether one fragment of the compressed data has been recorded. One fragment includes compressed data of a predetermined playback time.

If it is determined in step S80 that one fragment of the compressed data has been recorded, the process proceeds to step S81, where the compressed data recording controller 43 corrects the information indicating the size included in the header of the mdat box in which the compressed data has been written and in which the corresponding management information has not been written. The information is corrected so as to indicate the amount of the data written in the mdat box. In step S82, the management information fragment recording controller 44 allows the file generator 5 to output a management information fragment as an initial moov box or a moof box, which is used to refer to one fragment of the compressed data in one mdat box. The management information fragment recording controller 44 allows the drive controlling microcomputer 12 to write the management information fragment as an initial moov box or a moof box after the mdat box on the recording medium 20.

More specifically, in step S82, the management information fragment recording controller 44 allows the management information fragment about the first mdat box in the file to be written as an initial moov box and also allows the management information fragment about the second or more mdat box to be written as a moof box.

In this way, in step S82, recording of the management information fragments is controlled so that the management information fragments and data fragments are alternately placed, each management information fragment being used to read the corresponding data fragment.

After step S82, the process returns to step S72, where a header of the next mdat box is written. Then, the following steps are repeated so that another fragment of the compressed data is recorded in the next mdat box.

If it is determined in step S80 that one fragment of the compressed data has not been recorded, the process returns to step S73 and the following steps are repeated.

If it is determined in step S79 that all data has been recorded, the process proceeds to step S83, where the compressed data recording controller 43 corrects the information indicating the size included in the header of the mdat box in which the compressed data has been written and in which the corresponding management information has not been written. The information is corrected so as to indicate the amount of the data written in the mdat box. In step S84, the management information fragment recording controller 44 allows the file generator 5 to output a management information fragment as an initial moov box or a moof box, which is used to refer to one fragment of the compressed data in one mdat box. The management information fragment recording controller 44 allows the drive controlling microcomputer 12 to write the management information fragment as an initial moov box or a moof box after the mdat box on the recording medium 20.

More specifically, in step S84, the management information fragment recording controller 44 allows the management information fragment about the first mdat box in the file to be written as an initial moov box and also allows the management information fragment about the second or more mdat box to be written as a moof box.

Alternatively, step S84 can be omitted.

In step S85, the entire management information recording controller 45 outputs the entire management information that is held in the memory 17 by the management information holder 41 to the memory controller 8. The entire management information means all of the management information fragments about all of the video and audio data stored in the file. The entire management information recording controller 45 allows the drive controlling microcomputer 12 to write the entire management information as a moov box at the end of the file on the recording medium 20.

In this way, after all data has been recorded, recording of the entire management information used to read all of the data is controlled in step S85.

In step S86, the rewrite controller 46 controls the drive controlling microcomputer 12 so as to seek to the top of the file. In step S87, the rewrite controller 46 allows the drive controlling microcomputer 12 to rewrite the initial moov box and all of the moof boxes to free boxes, and then the process ends. That is, in step S87, the rewrite controller 46 controls rewrite of the management information fragments so that each management information fragment is not used to read the corresponding data fragment after all of the data has been recorded. More specifically, the name of the initial moov box and all of the moof boxes is changed to four characters "free", so that the initial moov box and all of the moof boxes are rewritten to free boxes.

Figure 8A:
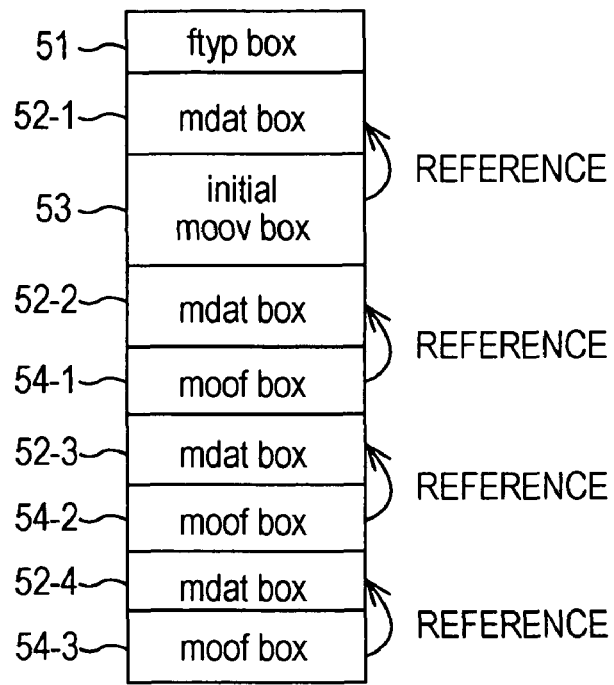
FIGS. 8A and 8B show configurations of an MP4 file.

After step S84 has been done, the file structure shown in FIG. 8A can be obtained. That is, an ftyp box 51 is placed at the top of the file, the ftyp box 51 being followed by an mdat box 52-1, an initial moov box 53, an mdat box 52-2, a moof box 54-1, an mdat box 52-3, a moof box 54-2, an mdat box 52-4, and a moof box 54-3. In other words, mdat boxes and moof boxes are alternately placed after the initial moov box 53.

For example, if the recording process abnormally ends after step S84, the management information fragment stored in the initial moov box 53 is used to read the video and audio data fragment from the mdat box 52-1, the management information fragment stored in the moof box 54-1 is used to read the video and audio data fragment from the mdat box 52-2, the management information fragment stored in the moof box 54-2 is used to read the video and audio data fragment from the mdat box 52-3, and the management information fragment stored in the moof box 54-3 is used to read the video and audio data fragment from the mdat box 52-4.

For example, when the video and audio data fragment stored in the first mdat box 52-1 is to be read, the management information fragment stored in the initial moov box 53 is read and is referred to, so that the video and audio data fragment in the mdat box 52-1 is read. When the video and audio data fragment stored in any of the second and more mdat boxes 52-2 to 52-4 is to be read, the management information fragment stored in any of the moof boxes 54-1 to 54-3 after the mdat boxes 52-2 to 52-4 is read and is referred to, so that the video and audio data fragment stored in any of the mdat boxes 52-2 to 52-4 is read.

In steps S85 to S87, a moov box including the entire management information about all of the video and audio data stored in this file is written at the end of the file, and the initial moov box 53 and the moof boxes 54-1 to 54-3 are rewritten to free boxes.

Figure 8B:
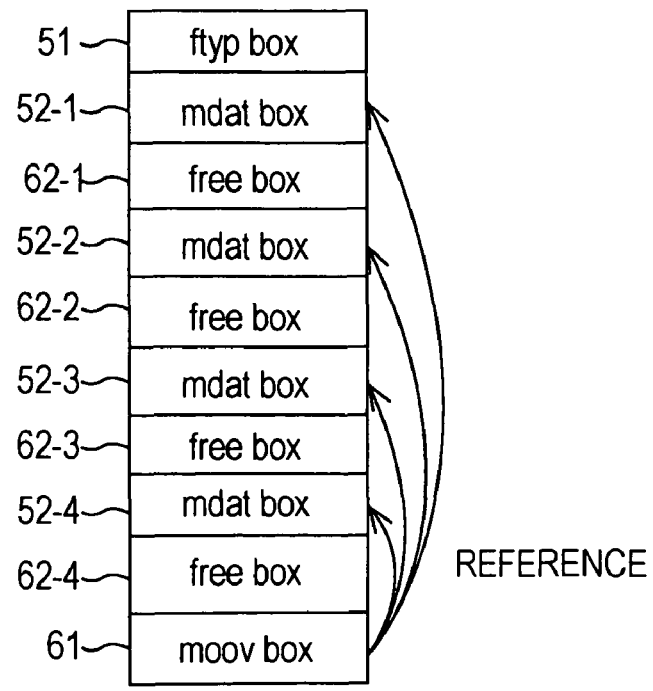

If the recording process normally ends, a moov box 61 is placed at the end of the file, as shown in FIG. 8B. The moov box 61 stores the entire management information about all of the video and audio data stored in this file. The ftyp box 51 is placed at the top of the file, the ftyp box 51 being followed by the mdat box 52-1 and a free box 62-1 which has been rewritten from the initial moov box 53. The free box 62-1 is followed by the mdat box 52-2 and a free box 62-2 which has been rewritten from the moof box 54-1. After that, the mdat box 52-3, a free box 62-3 which has been rewritten from the moof box 54-2, the mdat box 52-4, and a free box 62-4 which has been rewritten from the moof box 54-3 are placed in this order. That is, mdat boxes and free boxes are alternately placed after the ftyp box 51.

Herein, the free boxes 62-1 to 62-4 are areas that are generated by rewriting the management information fragments, which are placed between data fragments and which are used to read the data fragments, so that each management information fragment is not used to read the corresponding data fragment.

In the case where the recording process has normally ended, if the video and audio data fragment stored in any of the mdat boxes 52-1 to 52-4 is to be read, the management information stored in the moov box 61 is read and is referred to, so that the video and audio data fragment stored in any of the mdat boxes 52-1 to 52-4 is read.

In other words, the file recorded on the recording medium 20 is provided with areas that are generated by rewriting the management information fragments, which are placed between data fragments and which are used to read the data fragments, so that each management information fragment is not used to read the corresponding data fragment. In addition, the entire management information used to read the all data is placed in the file.

Since the entire management information is stored in one area, video and audio data can be randomly and quickly accessed and read while preventing inefficient seek.

If the recording process abnormally ends, each data fragment can be read with reference to the corresponding management information fragment.

That is, an advantage of fragment recording in which management information is recorded while being fragmented and an advantage of normal recording in which the entire management information is recorded in one area can be obtained at the same time.

As described above, a plurality of files need not be dealt with at the same time, but only one file in which video and audio data is to be written is dealt with in the recording process. As a result, a sophisticated file system or operating system and a complicated process are not required. Therefore, the system controlling microcomputer 9 is not required to have an enhanced processing ability.

Of course, a special function of sequentially placing data fragments stored in different files on a recording medium is unnecessary.

Further, when video and audio data is to be read (or played back) from the file, only one file needs to be dealt with. That is, a plurality of files need not be dealt with at the same time because the data and its management information are stored in the same file.

As described above, not only a file that is normally recorded but also a file that is abnormally recorded can be played back by a standard player capable of playing back an MP4 file storing data fragments. Since the file includes data and management information, the player can easily play back the data without accessing a plurality of files. In other words, the data can be easily played back by a player of less enhanced processing ability.

Since requirements to the file system reduce, data can be recorded on more types of recording medium.

As described above, data can be quickly and randomly accessed without dealing with a plurality of files at the same time, and the data can be played back even if the recording thereof abnormally ends.

Alternatively, the following method can be adopted. Compressed video and audio data is stored in the memory 7. An initial moov box as a management information fragment about a first mdat box is written after an ftyp box. A fragment of the compressed video and audio data stored in the memory 7 is written as a first mdat box after the initial moov box. Then, a moof box as a management information fragment about a second mdat box is written after the first mdat box, and another fragment of the compressed video and audio data stored in the memory 7 is written after the moof box. This process is repeated until all of the compressed video and audio data has been written. Then, the entire management information about all of the video and audio data is written as a moov box at the end of the file, and the initial moov box and all of the moof boxes are rewritten to free boxes.

In this method, the video and audio data stored in the memory 7 is written at one time as an mdat box after the initial moov box or the moof box has been written. Therefore, the initial moov box or the moof box to store the management information fragment about the written mdat box reliably exists in the file. Further, a process of rewriting the size of the header of the mdat box is not necessary, and the size of the header of the mdat box constantly has a correct value. Therefore, even if the recording process abnormally ends, the probability that the file violates the MP4 file format and data cannot be read can be reduced. In other words, a corruption resistance of the file can be enhanced.

Figure 9A:
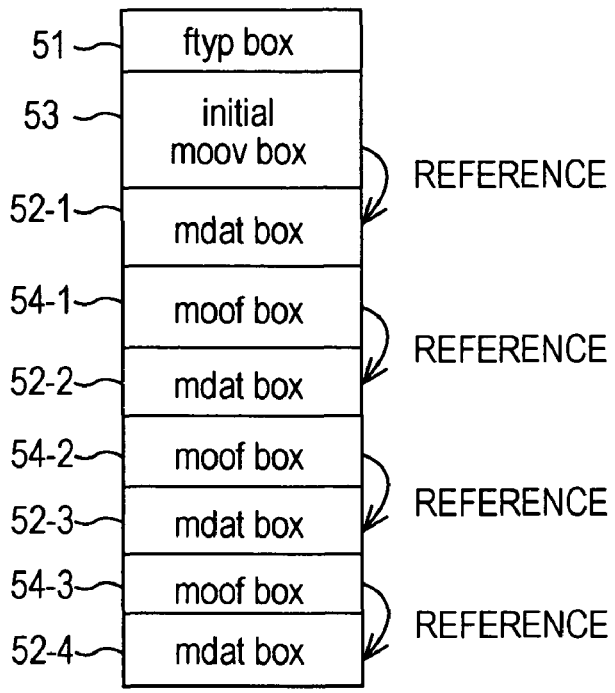
FIGS. 9A and 9B show other configurations of the MP4 file.

In the above-described method, the file structure shown in FIG. 9A can be obtained after the ftyp box, initial moov box, all mdat boxes, and all moof boxes have been recorded. That is, an ftyp box 51 is placed at the top of the file, the ftyp box 51 being followed by an initial moov box 53 and an mdat box 52-1. The mdat box 52-1 is followed by a moof box 54-1, an mdat box 52-2, a moof box 54-2, an mdat box 52-3, a moof box 54-3, and an mdat box 52-4. That is, moof boxes and mdat boxes are alternately placed after the mdat box 52-1.

For example, if the recording process abnormally ends after the ftyp box, the initial moov box, all of the mdat boxes, and all of the moof boxes have been recorded, the management information fragment stored in the initial moov box 53 is used to read the video and audio data fragment from the mdat box 52-1, the management information fragment stored in the moof box 54-1 is used to read the video and audio data fragment from the mdat box 52-2, the management information fragment stored in the moof box 54-2 is used to read the video and audio data fragment from the mdat box 52-3, and the management information fragment stored in the moof box 54-3 is used to read the video and audio data fragment from the mdat box 52-4, as shown in FIG. 9A.

In other words, when the video and audio data fragment stored in the first mdat box 52-1 is to be read, the management information fragment stored in the initial moov box 53 is read and is referred to, so that the video and audio data fragment in the mdat box 52-1 is read. When the video and audio data fragment stored in any of the second and more mdat boxes 52-2 to 52-4 is to be read, the management information fragment stored in any of the moof boxes 54-1 to 54-3 before the mdat boxes 52-2 to 52-4 is read and is referred to, so that the video and audio data fragment stored in any of the mdat boxes 52-2 to 52-4 is read.

At the end of the recording process, a moov box including the entire management information about all of the video and audio data stored in the file is written at the end of the file, and the initial moov box 53 and the moof boxes 54-1 to 54-3 are rewritten to free boxes.

Figure 9B:
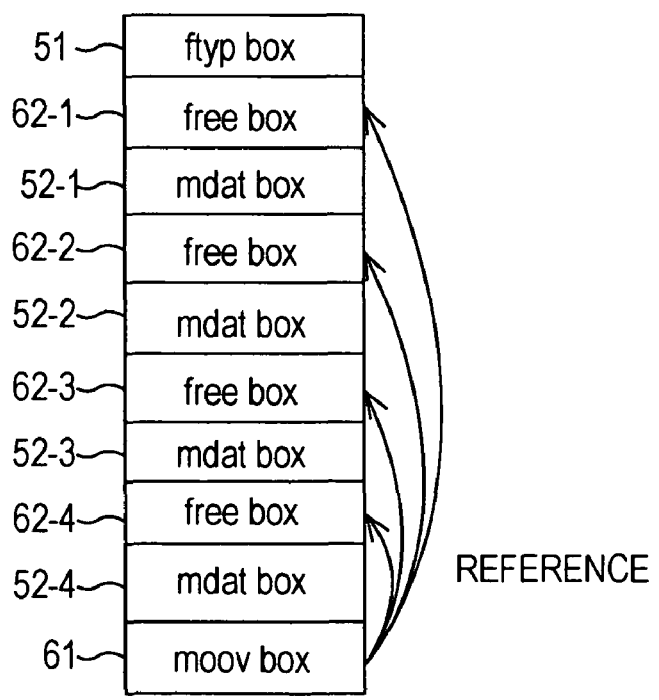

If the recording process normally ends, the file structure shown in FIG. 9B can be obtained. That is, a moov box 61 storing the entire management information about all of the video and audio data stored in this file is placed at the end of the file. The ftyp box 51 is placed at the top of the file, the ftyp box 51 being followed by a free box 62-1 which has been rewritten from the initial moov box 53 and the mdat box 52-1. After the mdat box 52-1, a free box 62-2 which has been rewritten from the moof box 54-1, the mdat box 52-2, a free box 62-3 which has been rewritten from the moof box 54-2, the mdat box 52-3, a free box 62-4 which has been rewritten from the moof box 54-3, and the mdat box 52-4 are placed in this order. That is, free boxes and mdat boxes are alternately placed after the ftyp box 51.

In this case, too, since the entire management information is stored in one area, video and audio data can be randomly and quickly accessed and read while preventing inefficient seek.

During a recording process and a playback process (reading process), only one file need be dealt with, and a plurality of files need not be dealt with at the same time.

That is, data can be quickly and randomly accessed without dealing with a plurality of files at the same time. Furthermore, the data can be played back even if the recording abnormally ends.

Hereinafter, another example of rewriting management information fragments so that they are not used to read data fragments is described.

Figure 10:
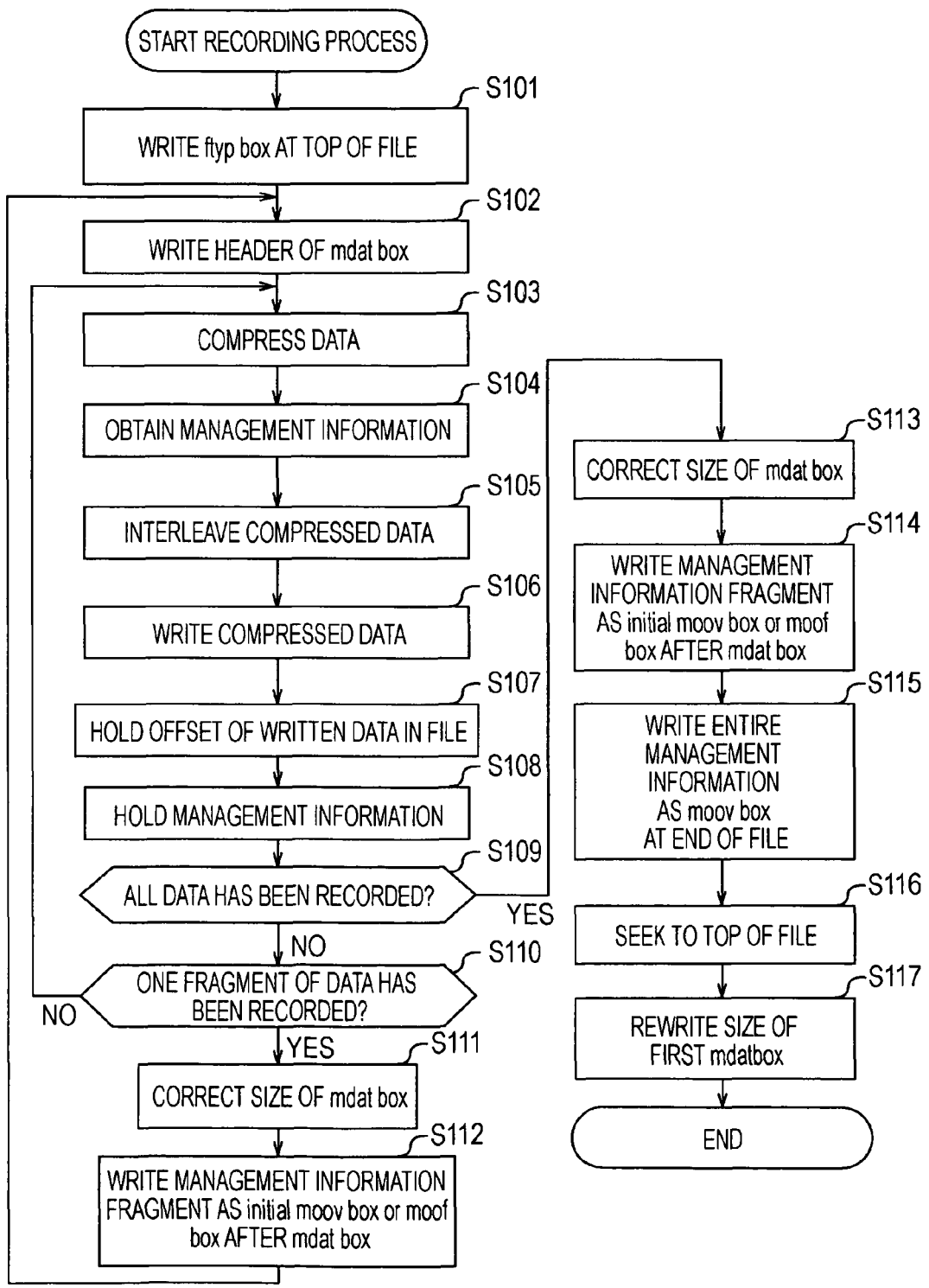
FIG. 10 is a flowchart illustrating another example of the recording process.

FIG. 10 is a flowchart illustrating another example of the recording process performed by the recording/playback apparatus. Steps S101 to S116 are the same as steps S71 to S86 shown in FIG. 7, respectively, and thus the corresponding description is omitted.

In step S117, the rewrite controller 46 allows the drive controlling microcomputer 12 to rewrite the size of the first mdat box in the file so that each management information fragment is not used to read the corresponding data fragment. Then, the process ends. More specifically, in step S117, the rewrite controller 46 allows the drive controlling microcomputer 12 to rewrite the size of the first mdat box in the file to a value that is equal to the total size of all of the mdat boxes, the initial moov box, and all of the moof boxes.

That is, in step S117, the rewrite controller 46 controls rewrite of the data so that each management information fragment is not used to read the corresponding data fragment, if all of the data has been recorded.

Figure 11A:
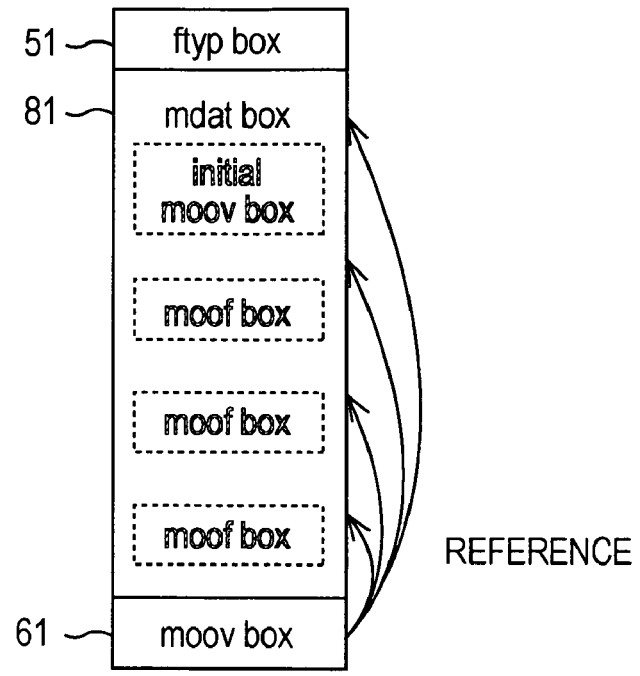
FIGS. 11A and 11B show configurations of an MP4 file.

If the recording process of the flowchart shown in FIG. 10 normally ends, the file structure shown in FIG. 11A can be obtained. That is, a moov box 61 storing the entire management information about all of the video and audio data stored in this file is placed at the end of the file. An ftyp box 51 is placed at the top of the file, and an mdat box 81 is placed between the ftyp box 51 and the moov box 61. The mdat box 81 includes the initial box and all of the moof boxes written in step S112 or S114. The initial moov box and all of the moof boxes included in the mdat box 81 satisfy the data format as an initial moov box or a moof box. However, the management information stored in the moov box 61 does not refer to any of the initial moov box and moof boxes included in the mdat box 81, and the playback apparatus to play back this file ignores the initial moov box and all of the moof boxes included in the mdat box 81. In other words, the playback apparatus to play back this file uses only the video and audio data among all data stored in the mdat box 81.

When the video and audio data stored in the mdat box 81 is to be read, the management information stored in the moov box 61 is read and is referred to, so that the video and audio data stored in the mdat box 81 is read.

Since the entire management information is stored in one area, video and audio data can be randomly and quickly accessed and read while preventing inefficient seek.

During a recording process and a playback process (reading process), only one file need be dealt with, and a plurality of files need not be dealt with at the same time.

That is, data can be quickly and randomly accessed without dealing with a plurality of files at the same time. Furthermore, the data can be played back even if the recording abnormally ends.

Alternatively, the following method can be adopted. Compressed video and audio data is stored in the memory 7. An initial moov box as a management information fragment about a first mdat box is written after an ftyp box. A fragment of the compressed video and audio data stored in the memory 7 is written as a first mdat box after the initial moov box. Then, a moof box as a management information fragment about a second mdat box is written after the first mdat box, and another fragment of the compressed video and audio data stored in the memory 7 is written after the moof box. This process is repeated until all of the compressed video and audio data has been written. Then, the initial moov box is rewritten to a free box, and the size of the first mdat box in the file is rewritten to a value equal to the total size of all of the mdat boxes and moof boxes.

Figure 11B:
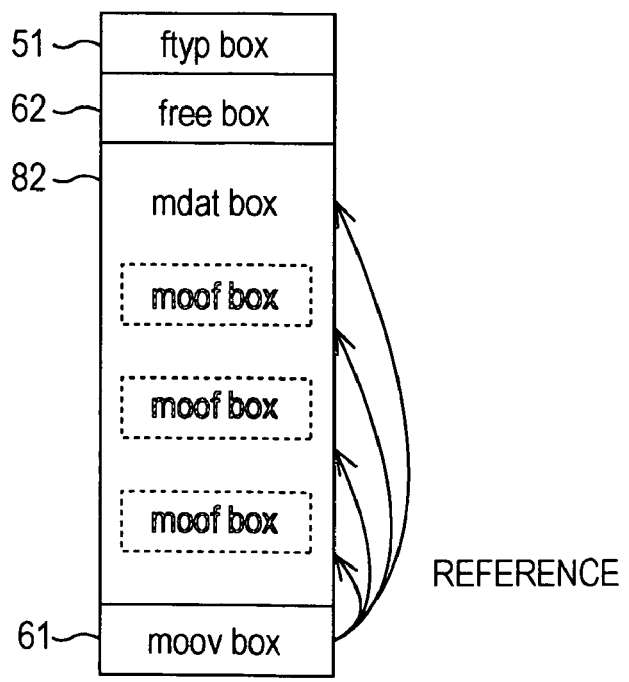

In this case, a moov box 61 storing the entire management information about all of the video and audio data stored in this file is placed at the end of the file, as shown in FIG. 11B. The ftyp box 51 is placed at the top of the file, followed by a free box 62 which has been rewritten from the initial moov box. One mdat box 82 is placed between the free box 62 and the moov box 61. The mdat box 82 includes all moof boxes written in the file. All of the moof boxes included in the mdat box 82 satisfy the data format as a moof box. However, the management information stored in the moov box 61 does not refer to any of the moof boxes included in the mdat box 82, and the playback apparatus to play back this file ignores all of the moof boxes included in the mdat box 82. In other words, the playback apparatus to play back this file uses only the video and audio data among the data stored in the mdat box 82.

When the video and audio data stored in the mdat box 82 is to be read, the management information stored in the moov box 61 is read and is referred to, so that the video and audio data stored in the mdat box 82 is read.

Since the entire management information is stored in one area, video and audio data can be randomly and quickly accessed and read while preventing inefficient seek.

During a recording process and a playback process (reading process), only one file need be dealt with, and a plurality of files need not be dealt with at the same time.

That is, data can be quickly and randomly accessed without dealing with a plurality of files at the same time. Furthermore, the data can be played back even if the recording abnormally ends.

In the above-described embodiment, the file is recorded on the recording medium 20 which is a rewritable optical disc.

Alternatively, the file can be recorded on another type of recording medium, such as a magnetic disk or a semiconductor memory.

The video encoder 1 or the audio encoder 2 may be realized by the system controlling microcomputer 9 that executes the program. In other words, the video encoder 1 or the audio encoder 2 may be realized in either a hardware manner or a software manner.

In the above-described embodiment, the MP4 file format is adopted, but the present invention is not limited to this file format. The process of rewriting management information fragments so that they are not used to read data fragments is not limited to the process of rewriting the name of a box or rewriting the size of an mdat box. For example, a process of rewriting information or ID indicating the attribute of data or rewriting a flag indicating usable or not usable may be adopted.

In the above-described embodiment, the present invention is applied to a digital video camera. Alternatively, the present invention can be applied to other various apparatuses, such as a personal computer or mobile phone having a shooting function.

As described above, recording of first management information is controlled so that fragments of the first management information and fragments of data are alternately placed, each fragment of the first management information being used to read the corresponding data fragment; recording of second management information is controlled after all of the data has been recorded, the second management information being used to read all of the data; and rewrite of the first management information or the data is controlled after all of the data has been recorded so that any fragment of the first management information is not used to read the corresponding data fragment. With this configuration, data can be quickly and randomly accessed without dealing with a plurality of files at the same time. Furthermore, the data can be played back even if the recording abnormally ends.

The file recorded on the data recording medium includes areas and second management information, the areas being generated by rewriting fragments of first management information, which are placed between fragments of data and are used to read the corresponding data fragment, so that any fragment of the first management information is not used to read the corresponding data fragment, and the second management information being used to read all of the data. With this configuration, the playback side can quickly and randomly access the data without dealing with a plurality of files at the same time, and the data can be played back even if the recording abnormally ends.

The above-described series of processes can be executed by hardware or software. When the series of processes are executed by software, a program constituting the software is installed through a recording medium to a computer incorporated in dedicated hardware or a multi-purpose personal computer capable of executing various functions by being installed with various programs.

This recording medium may be a package medium that is separated from a computer and is distributed to provide a user with a program, such as the recording medium 20 shown in FIG. 5, e.g., a magnetic disk (including a flexible disk), an optical disc (including a CD-ROM (compact disc read only memory) and a DVD (digital versatile disc)), or a magneto-optical disc (including an MD (MiniDisc®)), and a semiconductor memory (not shown). Also, the recording medium may be a ROM that is provided to a user while being incorporated in the computer and that is included in the system controlling microcomputer 9.

The program to execute the above-described series of processes may be installed into the computer through a wired or wireless communication medium, such as a local area network, the Internet, or digital satellite broadcasting, via an interface including a router and a modem as necessary.

In this specification, the steps describing the program stored in the recording medium may be performed in time series in accordance with the described order, or may be performed in parallel or individually.

In this specification, the system means an entire unit including a plurality of apparatuses.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording apparatus comprising:
   first recording control means for controlling recording of first management information so that fragments of the first management information and fragments of data are alternately placed, each fragment of the first management information being used to read the corresponding data fragment;
   second recording control means for controlling recording of second management information after all of the data has been recorded, the second management information being used to read all of the data; and
   rewrite control means for controlling rewrite of the first management information or the data after all of the data has been recorded so that any fragment of the first management information is not used to read the corresponding data fragment,
   wherein the second recording control means controls recording of the second management information as a moov box, and the rewrite control means controls rewrite of a name of the first management information so that each fragment of the first management information as an initial moov box or a moof box and all other moof boxes are rewritten to free boxes, such that a ftyp box is placed on a top of a respective file, mdat boxes and free boxes are placed alternately after ftyp box, and the moov box is placed at an end of the file.

2. The recording apparatus according to claim 1,
   wherein the first recording control means controls recording of the first management information in a file so that the fragments of the first management information and the fragments of the data are alternately placed, each fragment of the first management information being used to read the corresponding data fragment stored in the file, and
   wherein the second recording control means controls recording of the second management information in the file after all of the data has been recorded, the second management information being used to read all of the data stored in the file.

3. The recording apparatus according to claim 1, wherein the rewrite control means controls rewrite of the name of the first management information so that any fragment of the first management information is not used to read the corresponding data fragment.

4. The recording apparatus according to claim 1, wherein the rewrite control means controls rewrite of information indicating the amount of the data so that any fragment of the first management information is not used to read the corresponding data fragment.

5. The recording apparatus according to claim 4, wherein the rewrite control means controls rewrite of the information indicating the amount of the data, the information being the size of an mdat box.

6. A recording method comprising the steps of:
controlling recording of first management information so that fragments of the first management information and fragments of data are alternately placed, each fragment of the first management information being used to read the corresponding data fragment;
controlling recording of second management information after all of the data has been recorded, the second management information being used to read all of the data; and
controlling rewrite of the first management information or the data after all of the data has been recorded so that any fragment of the first management information is not used to read the corresponding data fragment,
wherein the second management information is recorded as a moov box, and the rewrite is controlled so that a name of each, fragment the first management information as an initial moov box or a moof box and all other moof boxes are rewritten to free boxes, that a ftyp box is placed on a top of a respective file, mdat boxes and free boxes are placed alternately after the p box, and the moov box is placed at an end of the file.

7. A non-transitory computer readable storage medium having stored thereon a program allowing a computer to execute the steps of:
controlling recording of first management information so that fragments of the first management information and fragments of data are alternately placed, each fragment of the first management information being used to read the corresponding data fragment;
controlling recording of second management information after all of the data has been recorded, the second management information being used to read all of the data; and
controlling rewrite of the first management information or the data after all of the data has been recorded so that any fragment of the first management information is not used to read the corresponding data fragment,
wherein the second management information is recorded as a moov box, and the rewrite is controlled so that a name of each fragment of the first management information as an initial moov box or a moof box and all other moof boxes are rewritten to free boxes, such that a ftyp box is placed on a top of a respective file, mdat boxes and free boxes are placed alternately after the ftyp box, and the moov box is placed at an end of the file.

8. A non-transitory computer readable data recording medium having stored thereon a file including areas and second management information, the areas being generated by rewriting fragments of first management information, which are placed between fragments of data and are used to read the corresponding data fragment, so that any fragment of the first management information is not used to read the corresponding data fragment, and the second management information being used to read all of the data,
wherein the second management information recorded as a moov box, and the first management information is rewritten so that each fragment of the first management information as an initial moov box moof box and all other moof boxes are rewritten to free boxes, such that a ftyp box is placed on a top of the file, mdat boxes and free boxes are placed alternately after the ftyp box, and the moov box is placed at an end of the file.

9. A recording apparatus comprising:
a first recording control device configured to control recording of first management information so that fragments of the first management information and fragments of data are alternately placed, each fragment of the first management information being used to read the corresponding data fragment;
a second recording control device configured to control recording of second management information after all of the data has been recorded, the second management information being used to read all of the data; and
a rewrite control device configured to control rewrite of the first management information or the data after all of the data has been recorded so that any fragment of the first management information is not used to read the corresponding data fragment,
wherein the second recording control device controls recording of the second management information as a moov box, and the rewrite control device controls rewrite of a name of the first management information so that each fragment of the first management information as an initial moov box or a moof box and all other moof boxes are rewritten to free boxes, such that a ftyp box is placed on a top of a respective file, mdat boxes and free boxes are placed alternately after ftyp box, and the moov box is placed at an end of the file.

* * * * *